United States Patent
Asthana et al.

(10) Patent No.: US 7,233,583 B2
(45) Date of Patent: Jun. 19, 2007

(54) METHOD AND APPARATUS PROVIDING CONTEXT TRANSFER FOR INTER-BS AND INTER-PCF HANDOFFS IN A WIRELESS COMMUNICATION SYSTEM

(75) Inventors: Sarvesh Asthana, San Diego, CA (US); Jianhao Michael Yang, San Diego, CA (US)

(73) Assignee: Nokia Corporation, Espoo (FI)

( * ) Notice: Subject to any disclaimer, the term of this patent is extended or adjusted under 35 U.S.C. 154(b) by 556 days.

(21) Appl. No.: 10/878,455

(22) Filed: Jun. 28, 2004

(65) Prior Publication Data

US 2005/0286470 A1 Dec. 29, 2005

(51) Int. Cl.
*H04Q 7/00* (2006.01)

(52) U.S. Cl. .................. 370/332; 370/331; 370/332

(58) Field of Classification Search ............... 370/331, 370/332; 455/436, 437, 438, 439, 440, 441, 455/442, 443, 444
See application file for complete search history.

(56) References Cited

U.S. PATENT DOCUMENTS

| | | | |
|---|---|---|---|
| 7,154,868 B1 * | 12/2006 | Sharma et al. ............... | 370/331 |
| 2003/0053429 A1 | 3/2003 | Choi et al. ................... | 370/331 |
| 2003/0112766 A1 | 6/2003 | Riedel et al. ................ | 370/252 |
| 2004/0248577 A1 * | 12/2004 | Sayeedi ....................... | 455/445 |
| 2005/0185619 A1 * | 8/2005 | Niemela et al. ............. | 370/331 |

FOREIGN PATENT DOCUMENTS

| | | |
|---|---|---|
| EP | 1199841 A2 | 4/2002 |
| WO | WO-2004/001520 A2 | 12/2003 |
| WO | WO-2005/064892 A1 | 7/2005 |

OTHER PUBLICATIONS

Koodli, et al., "Fast Handovers and Context Transfers in Mobile Networks", Computer Communication Review, publ. of ACM SIGCOMM, vol. 31, No. 5, Oct. 2001, 11 pgs.
Koodli, et al., "Fast Handovers for Mobile IPv6", Jan. 30, 2004, pp. 1-38.
Perkins, C., IP Mobility Support for IPv4, Jan. 2002, pp. 1-92.
3GPP2 X.S0011-003-C, "cdma 2000 Wireless IP Network Standard: Packet Data Mobility and Resource Management", Version 1.0.0, Aug. 2003, 30 pgs.
3GPP2 X.S0011-002-C, "cdma2000 Wireless IP Network Standard: Simple IP and Mobile IP Access Services" Version 1.0.0, Aug. 2003, 44 pgs.
3GPP2 A.S0013-A, "Interoperability Specification (IOS) for cdma2000 Access Network Interfaces—Part 3 Features", Version 2.0.1, Jul. 2003, 338 pgs.

* cited by examiner

*Primary Examiner*—Nick Corsaro
*Assistant Examiner*—Shannon R. Brooks
(74) *Attorney, Agent, or Firm*—Harrington & Smith, PC

(57) ABSTRACT

In exemplary embodiments of this invention context transfers (static and dynamic) are optimally performed to maintain the same quality of service (QoS) for a Mobile Station (MS) during a CDMA inter-BS hard handoff, as well as during a CDMA inter-BS soft handoff. Context transfers (static and dynamic) are also optimally performed to maintain the same QoS for the MS during a CDMA inter-Packet Control Function (PCF) hard handoff.

18 Claims, 10 Drawing Sheets

METHOD AND APPARATUS PROVIDING CONTEXT TRANSFER FOR INTER-BS AND INTER-PCF HANDOFFS IN A WIRELESS COMMUNICATION SYSTEM

TECHNICAL FIELD

Preferred embodiments of this invention relate generally to methods and apparatus to perform handoffs of a mobile terminal (MT), or mobile node (MN), or mobile station (MS) in a wireless data communications system and, more specifically, relates to methods and apparatus to preserve context during the handoff of the MS.

BACKGROUND

There are number of different potential handoffs that can occur for a MS. These include, as non-limiting examples, inter-PDSN (Packet Data Service Node) handoffs, inter-BS (Base Station) hard handoffs, inter-BS soft handoffs, and inter-PCF (Packet Control Function) hard handoffs. In each of these different types of handoffs a problem that arises is related to preserving the context of the connection with the MS during the transfer. This invention is directed towards solving the context transfer problems that arise in the inter-BS and inter-PCF handoff cases. Commonly assigned U.S. patent application Ser. No. 10/878,452, filed on even date herewith and entitled "Method and Apparatus Providing Context Transfer for Inter-PDSN Handoffs in a Wireless Communication System", by Jianhao Michael Yang, Sarvesh Asthana and Rajeev Koodli, is directed towards solving the context transfer problems that arise in the inter-PDSN handoff scenario, and may thus be considered a related application to this patent application, and is incorporated by reference herein in its entirety.

The CDMA 2000 3GPP2 specification A.S0013 describes in detail the call flow involved in performing an inter-BS hard handoff and an inter-PCF hard handoff. As quality of service (QoS) issues are becoming more important to network operators and also to users it is expected that handoffs should not only solve the connectivity problem, but also provide the same QoS after a handoff. The call flow that is specified in the CDMA 2000 3GPP2 specification A.S0013 touches upon the QoS aspects involved in the hard handoff, but does not give a complete solution to maintaining the same QoS after the handoff. For example, before the hard handoff the serving or anchor BS, as well as the serving or anchor PCF, may maintain some state information to provide a negotiated level of QoS to the MS. However, this state information needs to be transferred over to the target BS, and to the target PCF, in order to provide a seamless handover in terms of MS QoS expectations Also, there is a period of time when the MS is switching from one physical channel to the other physical channel during a handoff that there is no connectivity between the MS and the network. This raises the possibility that data packets being sent to and from the MS can become lost.

In addition to the hard inter-BS and inter PCF handoffs, there are applications in the mobile network that require mobility management to maintain session continuity. Mobility management at the link layer is achieved though a soft handoff mechanism. The use of the soft handoff obviates the need to re-establish a session whenever the MS moves from one BS to another BS.

The current CDMA standard supports multiple service instances for a given MS. Relatedly, the soft handoff for multiple service instances requires careful consideration as to providing a seamless transfer of the context or QoS parameters from the source BS to the target BS for each MS service instance. The goals of such mobility management include eliminating service interruptions, reducing packet loss and delay time, and hence increasing the QoS.

A generic context transfer protocol has been previously proposed. However, at least two issues remain unaddressed in the existing context transfer mechanism.

A first issue is related to the contexts for real time applications such as VoIP (Voice over Internet Protocol), where the time sensitivity and accuracy of the transferred context is critical.

A second issue is related to link layer contexts versus IP layer contexts or application contexts. The link layer context is typically technology specific, and is normally coupled together with the handoff mechanism for that wireless technology, whereas in general the IP layer contexts or application contexts are more generic, and are less reliant on the underlying wireless technology.

For the case of CDMA wireless technology, when the MS performs an inter-BS soft handoff there are two types of contexts that can be transferred:

1. Static contexts such as SR_ID, service option, radio configuration, etc.; and
2. Dynamic contexts, such as link layer assisted header compression information. For example, the HRL (Header Reduction Lower) state information for LLA-ROHC (Link Layer Assisted-Robust Header Compression).

The dynamic type of context is time sensitive, implying that this type of context should be kept updated in order to ensure accuracy. Prior to this invention, there was no adequate context transfer mechanism for CDMA inter-BS soft handoffs.

The following standards are related to this invention: 3GPP2 TSG X.P0011.3: Wireless IP Network Standard: Packet Data Mobility and Resource Management; 3GPP2 TSG X.P0011.2: Wireless IP Network Standard: Simple IP and Mobile IP Access Services; 3GPP2 TSG A.S0013-A v2.0.1: 3GPP2 IOP for CDMA2000 Access network Interface; "Fast Handovers for Mobile IPv6", IETF [mobile-ip] Working Group draft, Rajeev Koodli (Ed.), Jan. 30, 2004; "Fast Handovers and Context Transfers in Mobile Networks", Rajeev Koodli and Charles E. Perkins, Computer Communication Review, apublication of ACM SIGCOMM, volume 31, number 5, October 2001. ISSN # 0146-4833; and RFC3220: IP Mobility Support for IPv4, C. Perkins (Ed.) January 2002.

As was the case of the inter-BS and inter-PCF hard handoffs discussed above, the CDMA 2000 3GPP2 specification A.S0013 details the call flow involved in performing inter-BS soft handoffs. As in the hard handoff case, the serving BS before the handoff may be maintaining state information to provide the negotiated QoS to the MS. During the soft handoff the state information needs to be transferred to the target BS in order to provide the seamless handover in terms of quality of service expectations.

Also, for those services involving multiple service instances, such as VoIP, there are different types of state information that should be handled differently depending on the nature of how the contexts are used.

It should thus be apparent that there is a need to provide improved techniques for performing inter-BS hard and soft handoffs, as well as inter-PCF hard handoffs. Prior to this invention, these needs were not adequately addressed or fulfilled.

SUMMARY OF THE PREFERRED EMBODIMENTS

The foregoing and other problems are overcome, and other advantages are realized, in accordance with the presently preferred embodiments of these teachings.

This invention provides in one aspect thereof a method to perform an inter-Base Station (BS) hard handoff for a Mobile Station (MS) from a source BS to a target BS, as well as BS that operates in accordance with the method, and a network that operates in accordance with the method. The method includes, at the start of the handoff procedure, sending a message from the source BS that comprises current QoS state information of each active and dormant service instance for the MS, and communicating the current QoS state information to the target BS; beginning the bi-casting of forward data for the MS from a Packet Control Function (PCF) to both the source BS and to the target BS, and updating the communicated current QoS state information in the target BS based on received bi-cast data; and continuing the updating of the QoS state information in the source BS based on data received from the MS, and communicating the updated QoS state information to the PCF with a source BS Disconnected message. In response to receiving the source BS Disconnected message, terminating the bi-casting of data with the PCF and when sending a Connected message to the target BS, also sending the updated QoS state information that was previously communicated from the source BS, thereby updating the target BS for a change in QoS state information that may have occurred at the source BS due to arrival of data from the MS prior to the source BS sending the Disconnected message.

In the preferred embodiment the method further includes beginning the buffering of data in the MS that would have sent in the reverse direction in response to receiving a message initiated by the source BS sending the Disconnect message, and resuming the sending of data in the reverse direction in response to receiving a message from the target BS indicating that the handoff procedure is completed.

This invention provides in another aspect thereof a method to perform an inter-BS soft handoff for a MS from a source BS to a target BS, as well as BS that operates in accordance with the method, and a network that operates in accordance with the method. The method includes, when making an initial soft handoff request, transferring only static QoS context state information from the source BS to the target BS, and informing the source BS of what context state information is supported by the target BS. Only for a case where the source BS is to be dropped from an active set of BSs in favor of the target BS, the method further includes, when sending a handoff direction message to the MS from the target BS, also initiating an interface setup procedure with an associated PCF and an associated PDSN and, when sending a message from the source BS to the target BS to indicate the beginning of the termination of the soft handover procedure, transferring dynamic QoS context state information from the source BS to the target BS.

This invention also provides in another aspect thereof a method to perform an inter-PCF hard handoff for a Mobile Station (MS) from a source PCF associated with a source BS to a target PCF associated with a target BS, as well as BS that operates in accordance with the method, and a network that operates in accordance with the method. The method includes, at the start of the handoff procedure, sending a message from the source BS that contains current QoS state information of each active and dormant service instance for the MS, and communicating the current QoS state information to the target BS; beginning the bi-casting of forward data for the MS from a PDSN to both the source PCF and to the target PCF; forwarding the bi-cast data from the source PCF to the source BS and from the target PCF to the target BS for updating the communicated current QoS state information in the target BS based on the received bi-cast data forwarded from the target PCF; continuing the updating of the QoS state information in the source BS based on data received from the MS, and communicating the updated QoS state information to the source PCF with a source BS Disconnected message. In response to receiving the source BS Disconnected message, the method further includes forwarding the updated QoS state information from the source PCF to the PDSN; forwarding the updated QoS state information from the PDSN to the target PCF and, when sending a Connected message to the target BS from the target PCF, also sending the updated QoS state information that was previously communicated to the target PCF from the source BS via the source PCF and the PDSN, thereby updating the target BS for a change in QoS state information that may have occurred at the source BS due to arrival of data from the MS prior to the source BS sending the Disconnected message.

As in the inter-BS hard handoff embodiment discussed above, it is preferred that the method include beginning the buffering of data in the MS that would have been sent in the reverse direction in response to receiving a message initiated by the source BS sending the Disconnect message, and resuming the sending of data in the reverse direction in response to receiving a message from the target BS indicating that the handoff procedure is completed.

It can be appreciated that a PDSN that is constructed and operated in support of the foregoing methods and apparatus is also an aspect of exemplary embodiments this invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
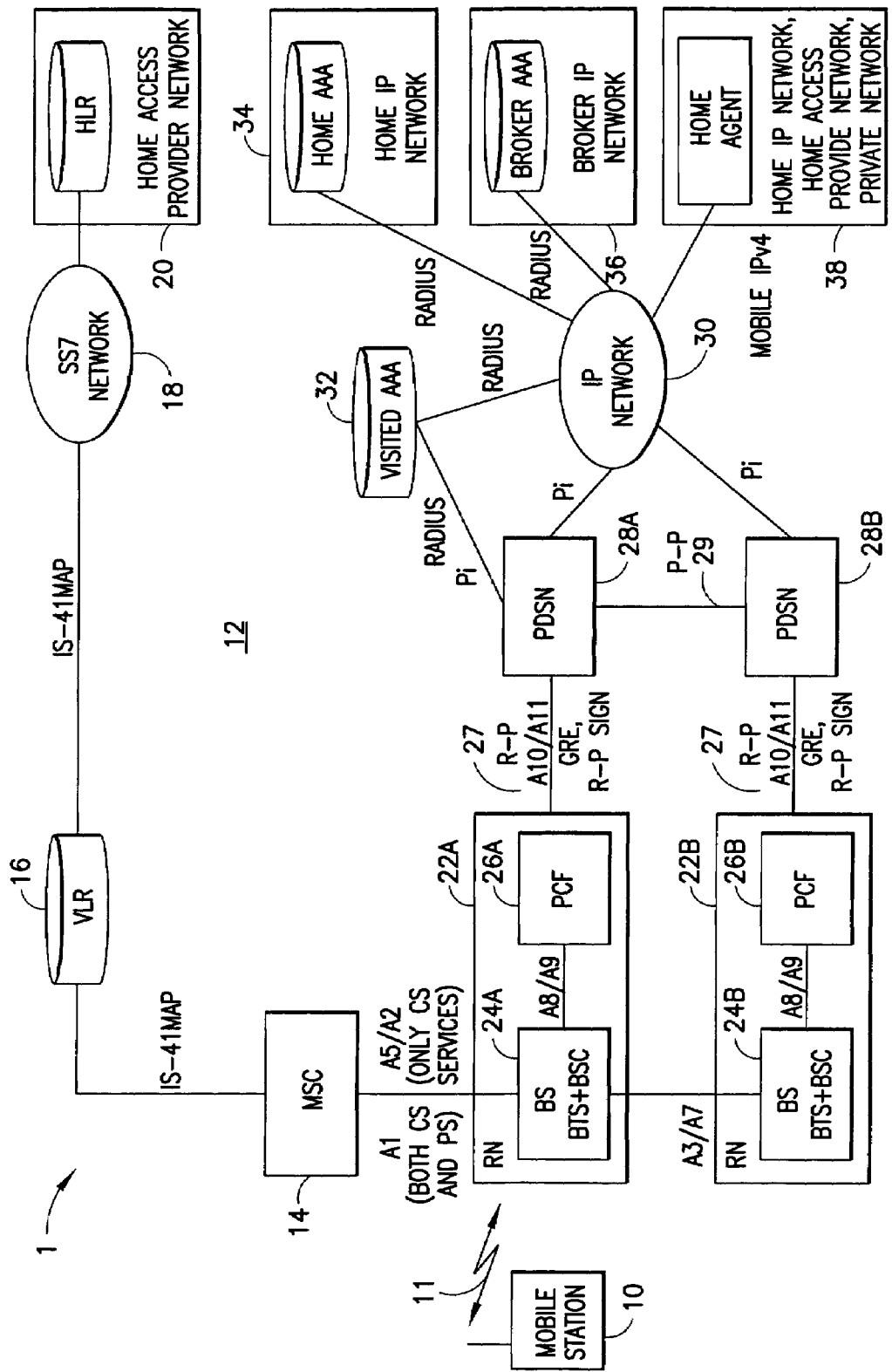
FIG. 1 is simplified block diagram of a wireless communication system, specifically a CDMA 2000 1x network, that is suitable for use in practicing the teachings of the various exemplary embodiments of this invention.

FIG. 1 is simplified block diagram of a wireless communication system 1, specifically a CDMA 2000 1× network that is suitable for use in practicing the teachings of the various exemplary embodiments of this invention. A description of FIG. 1 will be provided in order to place this invention into a suitable technological context. However, it should be appreciated that the specific network architecture and topology shown in FIG. 1 is not to be construed in a limiting sense upon this invention, as this invention could be practiced in networks having an architecture and topology that differs from that shown in FIG. 1. Further, the general concepts of this invention may be practiced as well in a TDMA-based mobile IP network, and is thus not limited for use only in a CDMA network. In general, this invention will find utility in wireless technologies where the MS context is partitioned into static and dynamic contexts. As such, while reading the ensuing description it should be noted that while some aspects of the description are specific to a CDMA network, such as the link layer PPP context, the description is not intended to be read in a limiting sense upon the implementation, use and practice of this invention.

The wireless communication system 1 shown in FIG. 1 includes at least one mobile station (MS) 10. The MS 10 may be or may include a cellular telephone, or any type of mobile terminal (MT) or mobile node (MN) having wireless communication capabilities including, but not limited to, portable computers, personal data assistants (PDAs), Internet appliances, gaming devices, imaging devices and devices having a combination of these and/or other functionalities. The MS 10 is assumed to be compatible with the physical and higher layer signal formats and protocols used by a network 12, and to be capable of being coupled with the network 12 via a wireless link 11. In the presently preferred embodiments of this invention the wireless link 11 is a radio frequency (RF) link, although in other embodiments the wireless link 11 could be an optical link.

In a conventional sense the network 12 includes a mobile switching center (MSC) 14 coupled through an IS-41 Map interface to a visitor location register (VLR) 16. The VLR 16 in turn is coupled through an IS-41 Map interface to a switching system seven (SS-7) network 18 and thence to a home location register (HLR) 20 that is associated with a home access provider network of the MS 10. The MSC 14 is also coupled through an A1 interface (for circuit switched (CS) and packet switched (PS) traffic) and through an A5/A2 interface (CS services only) to a first radio network (RN) 22A. The first RN 22A includes a base station (BS) 24A that includes a base transceiver station (BTS) and a base station center (BSC) that is coupled through an A8/A9 interface to a Packet Control Function (PCF) 26A. The PCF 26A is coupled via an R-P (PDSN/PCF) interface 27 (also called an A10/A11 interface) to a first packet data service node (PDSN) 28A and thence to an IP network 30 (via a Pi interface). The PDSN 28A is also shown coupled to a visited access, authorization and accounting (AAA) node 32 via a Pi and a remote authentication dial-in service (RADIUS) interface, that in turn is coupled to the IP network 30 via a RADIUS interface. Also shown coupled to the IP network 30 via RADIUS interfaces are a Home IP network AAA node 34 and a Broker IP network AAA node 36. A home IP network/home access provider network/private network Home Agent 38 is coupled to the IP network via a Mobile IPv4 interface. In accordance with RFC3220, the Home Agent 38 is a router on the home network of a mobile node (the MS 10 in this description) that tunnels datagrams for delivery to the mobile node when it is away from home, and that maintains current location information for the mobile node.

Also shown in FIG. 1 is a second RN 22B that is coupled to the first RN 22A via an A3/A7 interface. The second RN 22A includes a BS 24B and a PCF 26B and is coupled to a second PDSN 28B. The PDSN 28A and the PDSN 28B are coupled together through a P-P interface 29 (PDSN to PDSN interface, defined in IS835C).

For the purposes of description of this invention, and not by way of limitation, the first PDSN 28A is considered to be the anchor PDSN (a-PDSN), and the second PDSN 28B is considered to be the target PDSN (t-PDSN), for the MS 10. In like manner the associated BSs and PCFs can be assumed to be the anchor BS 24A and anchor PCF 26A, and the target BS 24B and target PCF 26B.

It should be noted, however, that there may be a plurality of BSs 24 connected to a single PCF 26 (defining a BS subnet), and that there may be a plurality of PCFs 26 within a given network all connected to a single PDSN 28. It may thus be the case that the source or anchor BS and the target BS may exist in the same BS subnet. Also, the source or anchor and target PCF may exist in the same network served by a single PDSN 28.

In a first aspect of this invention there is provided an improved technique for performing the inter-BS hard Handoff that communicates the QoS state information from the anchor or source BS 24A to the target BS. Note that in this embodiment the source and target BSs are assumed to be in the same PCF 26 (either PCF 26A or 26B, and thus the source and target BSs exist within the same subnet of the same RN 22, either RN 22A or RN 22B in FIG. 1).

This aspect of the invention makes an assumption that a seamless handover can be achieved only if the states maintained at the source network element are replicated exactly or nearly exactly on the target network element for the particular data session or service instance. In order to achieve this replication of the state, the invention operates to first send a snapshot of the state information to the target node. The invention then recognizes and accommodates the fact that after sending the initial state information, there may be changes in the source node state. These state changes can result from a sequence of events that occur due to packets being received in the reverse direction from the MS 10 and in the forward direction from the PDSN 28 until the MS 10 has been sent a UHDM (Universal Handoff Direction Message) and the A9-AL Disconnected message has been sent to the PCF 28.

The changes in the context state due to packets being sent in the forward direction (to the MS 10) can be replicated on the target node if the target node is given the same packets that the source node is given to send. The source node updates it's state and sends the packet out, but the target node just updates it's state and then drops the packet.

The changes in the state due to packets being received in the reverse direction (from the MS 10) can be updated in the existing messages once the MS 10 has been directed to go to the target BS 24, and the AL disconnected message has been sent to the PCF 26.

Also, once the MS 10 has been directed to move it is preferred that it ensures that the call is not terminated, and that the data that is not sent is buffered until the air link becomes available.

Figure 2A:
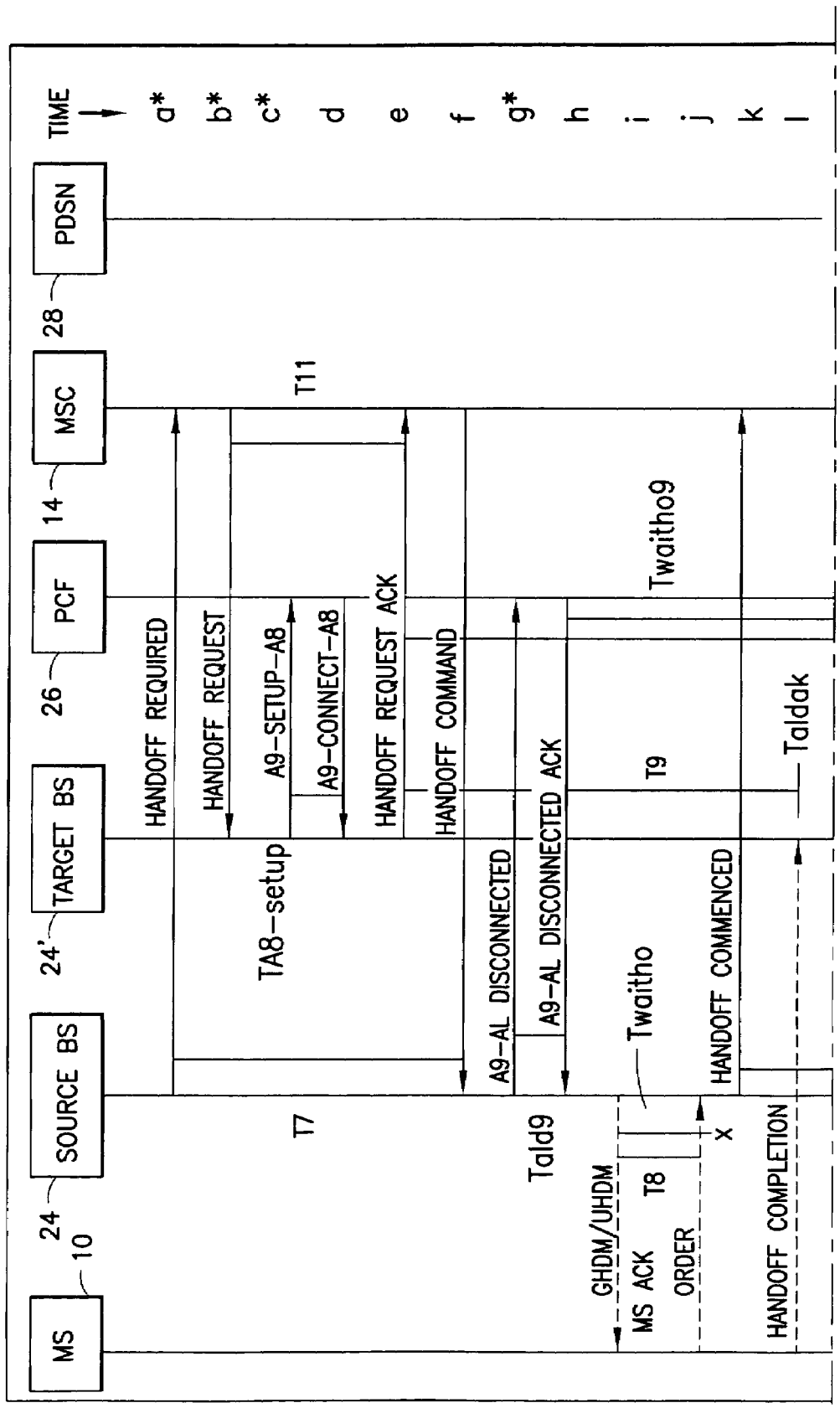
FIG. 2 shows a diagram that illustrates the messages that pass between various ones of the network nodes and elements of FIG. 1, in accordance with an inter-BS hard handoff procedure (within the same PCF), wherein certain steps indicated with asterisks are modified in accordance with an exemplary embodiment of this invention as described below.
Figure 2B:
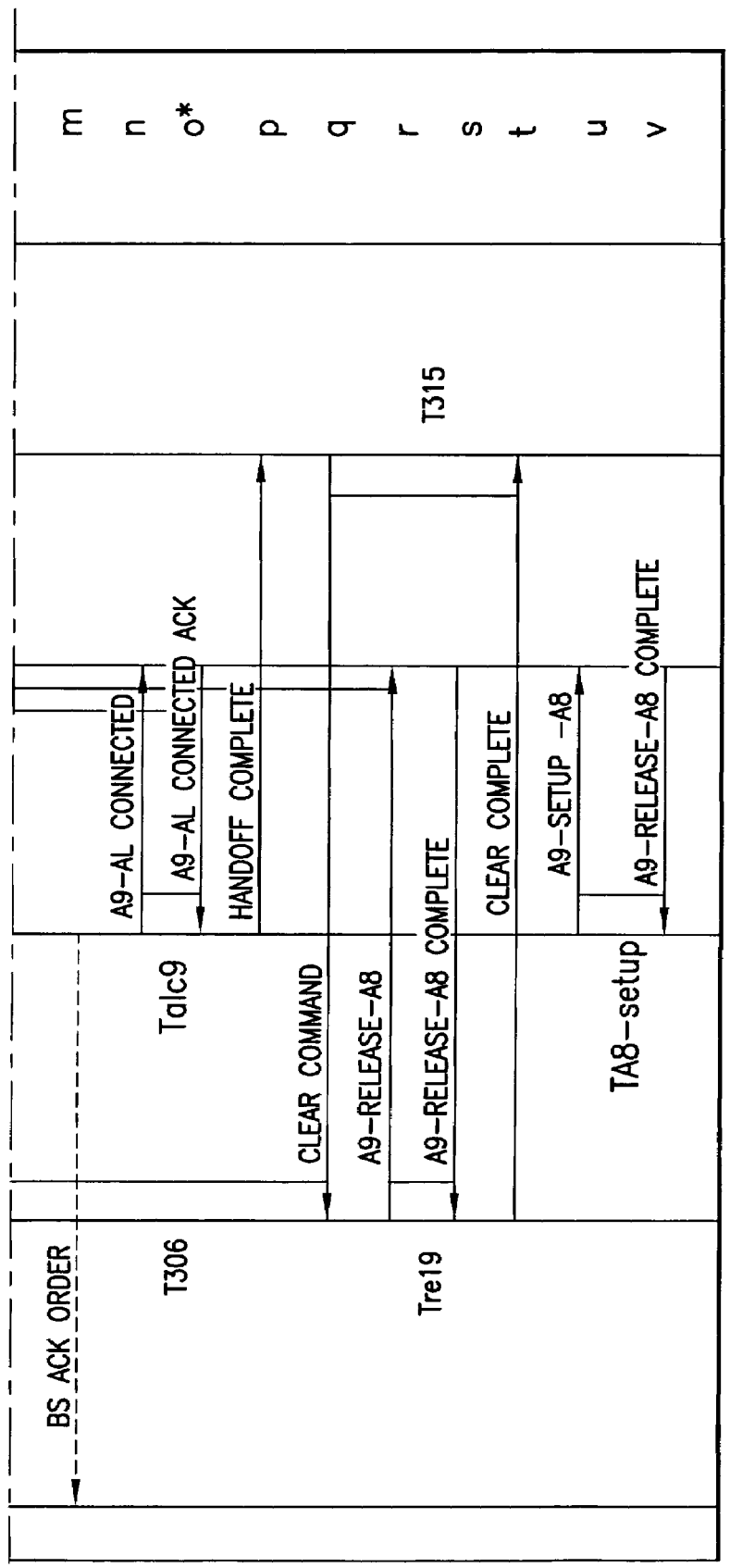
Figure 2:
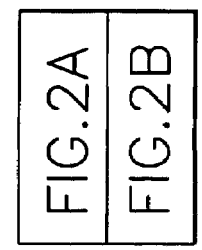

Reference is now made to the call or message flow diagram of FIG. 2. FIG. 2 illustrates the messages that pass between various ones of the network nodes and elements of FIG. 1, in accordance with an inter-BS hard handoff procedure (within the same PCF 26A or 26B), wherein certain steps indicated with asterisks are modified in accordance with an exemplary embodiment of this invention. FIG. 2 may also be viewed as a logic flow diagram that is illustrative of methods in accordance with exemplary embodiments of this invention. Only those steps that are changed in the call flow to implement this aspect of the invention are discussed. It is noted that since the source and target BSs are in the same subnet, the source BS is referred to as BS 24, while the target BS is referred to as BS 24'.

Step a: The HandoffRequired message from the source BS 24 to the MSC 14 carries information about the QoS state of each active and dormant service instance for the MS 10. This QoS state information may be considered to be the initial snapshot of the QoS state information.

Step b: The MSC 14 communicates this information to the target BS 24' in a HandoffRequest message.

It is noted that existing Packet Session Parameters fields can be used for carrying the QoS information in both the HandoffRequired and the HandoffRequest messages.

Step c: When the target BS 24' sends the A9-Setup-A8 message to the PCF 26 it indicates the SR_ID (Service Reference ID) and the MS 10 identification (IMSI) in the message. The SR_D is used by the MS 10 to tag a connection to the PDSN 28, and the connection to the PDSN 28 is also known as the service instance. The SR_ID is primarily used by the PDSN 28 to demultiplex the data received in the forward direction (to the MS 10) onto different service instances. The A9 Indicators message element in the message indicates to the PCF 26 that this is for a handoff-related call. The PCF 26 then looks up the existing A8 connection with the source BS 24 for this SR_ID and starts bi-casting the data being received from the PDSN 28 to both the source BS 24 and to the target BS 24'. This is done to ensure that whatever QoS state changes occur on the source BS 24 due to additional packets being sent in the forward direction are also reflected in the target BS 24'. The target BS 24' need not do anything with these packets, except to apply the same state change logic that is being applied by the source BS 24. In this manner the BS state is maintained up to date at the target BS 24' until the actual hard BS handover occurs.

The bi-casting of packets from the PCF 26 continues until the source BS 24 sends the A9-AL Disconnected message to the PCF 26, at which time the PCF 26 starts buffering the packet data, as specified in the CDMA 2000 A.S0013 call flow.

Step g: The state changes on the source BS 24 that are occurring due to the packets being received in the reverse direction from the MS 10 also need to be indicated to the target BS 24' to ensure that the BS state is completely synchronized after the handoff. The first state update information (initial state snapshot) that is sent to the target BS 24' in the HandoffRequired=>HandoffRequest message (Step b) may be changing because of the packets being received in the reverse direction between the time that the HandoffRequired message was sent and the UHDM/GHDM message sent by the source BS 24. To implement this function, the invention adds the state information to the A9-AL Disconnected message sent from the source BS 24 to the PCF 26. The PCF also stops bi-casting the packet data at this point.

Step o: The PCF 26 sends the QoS state information received in Step g from the source BS 24 when it sends the A9-Connect Ack message to the target BS 24', thereby updating the target BS 24' for the state change that may have occurred at the source BS 24 due to arrival of packets from the MS 10 up to the time that Step g was executed.

Relatedly, in order to avoid any loss of data in the reverse direction, and any loss of state because of this possible loss of data, the MS 10 begins buffering the data that it would have sent in the reverse direction once it receives the GHDM/UHDM message (see Step i). The MS 10 resumes sending the data in the reverse direction once it receives the BS Ack Order message from the target BS 24' (Step m) in response to the Handoff Completion message (Step 1). This ensures maintenance of the order of delivery of data for any protocols that require an ordered delivery of data to maintain their state.

The foregoing procedure, since it re-uses much of the existing standard, has a minimal impact on the existing standard.

In a second aspect of this invention there is provided an improved technique for performing the inter-PCF hard handoff where the QoS state information is communicated from the source PCF to the target PCF.

This aspect of the invention also relies on the concept that a seamless handover can be achieved only if the states maintained at the source network element are replicated exactly or nearly exactly on the target network element for the particular data session or service instance. In order to achieve this replication of the state, the invention provides mechanisms to first send a snapshot of the state information to the target node. The invention then identifies that after sending this initial update, there are still going to be changes in the source node state These changes are a result of a sequence of events, happening due to packets being received in the reverse direction from the mobile and in the forward direction from the PDSN 28 until the MS 10 has been sent the UHDM message and the A9-AL Disconnected message has been sent to the PCF 26. The changes in the state due to packets being sent in the forward direction can be replicated on the target node if the target node is given the same packets that the source node is given to send. The source node updates it's state and sends the packet out, but the target node just updates it's state and then drops the packet.

The changes in the state due to packets being received in the reverse direction can be updated in the existing messages once the MS 10 has been directed to go to target BS 24' and the AL disconnected message has been sent to the PCF 26.

As in the first embodiment discussed above, once the MS 10 has been directed to move it ensures that the call is not terminated, and the data that cannot be sent is buffered until the air link becomes available.

Figure 3A:
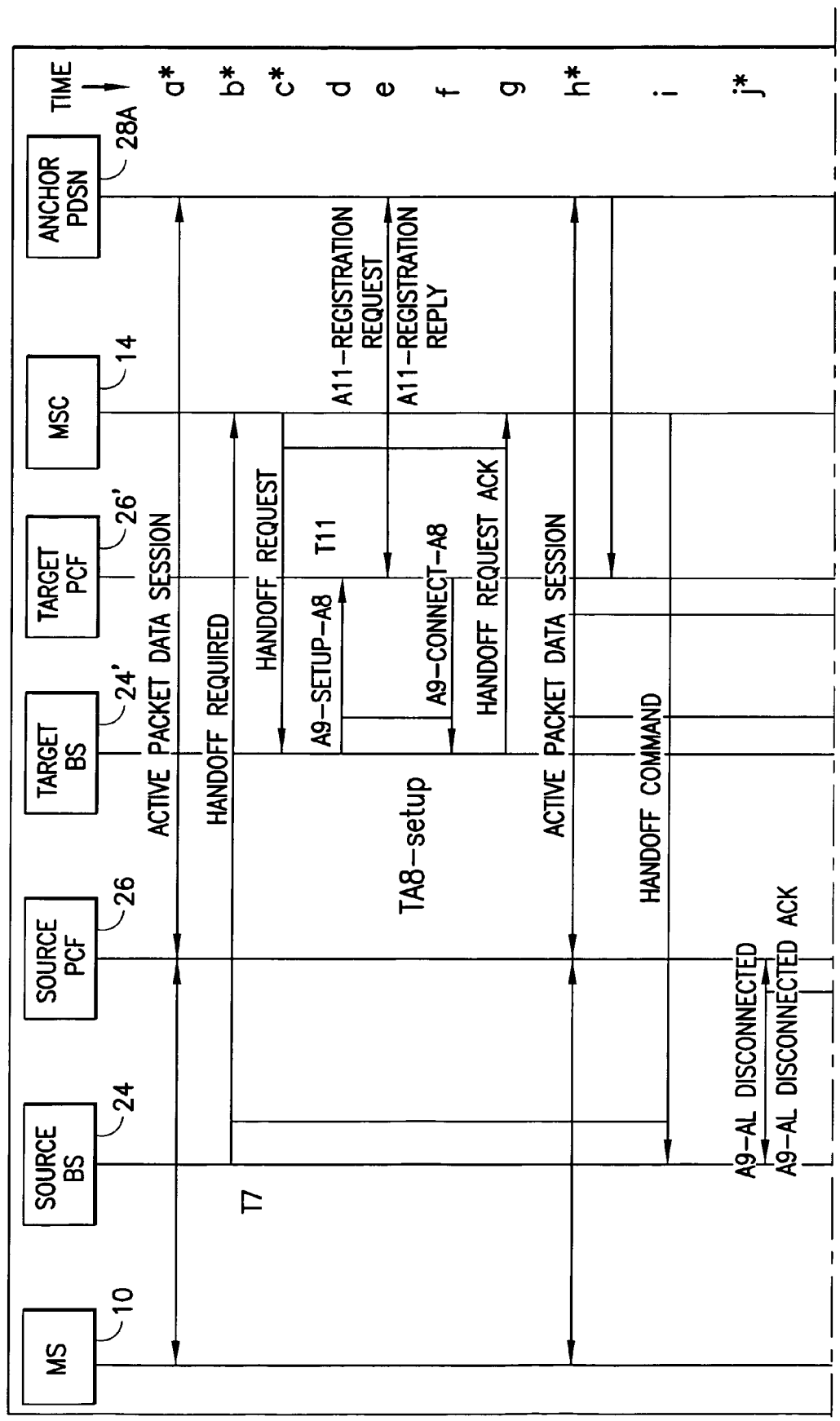
FIG. 3 is a diagram that illustrates the messages that pass between various ones of the network nodes and elements of FIG. 1, in accordance with an inter-PCF hard handoff procedure, wherein certain steps indicated with asterisks are modified in accordance with an exemplary embodiment of this invention as described below.
Figure 3B:
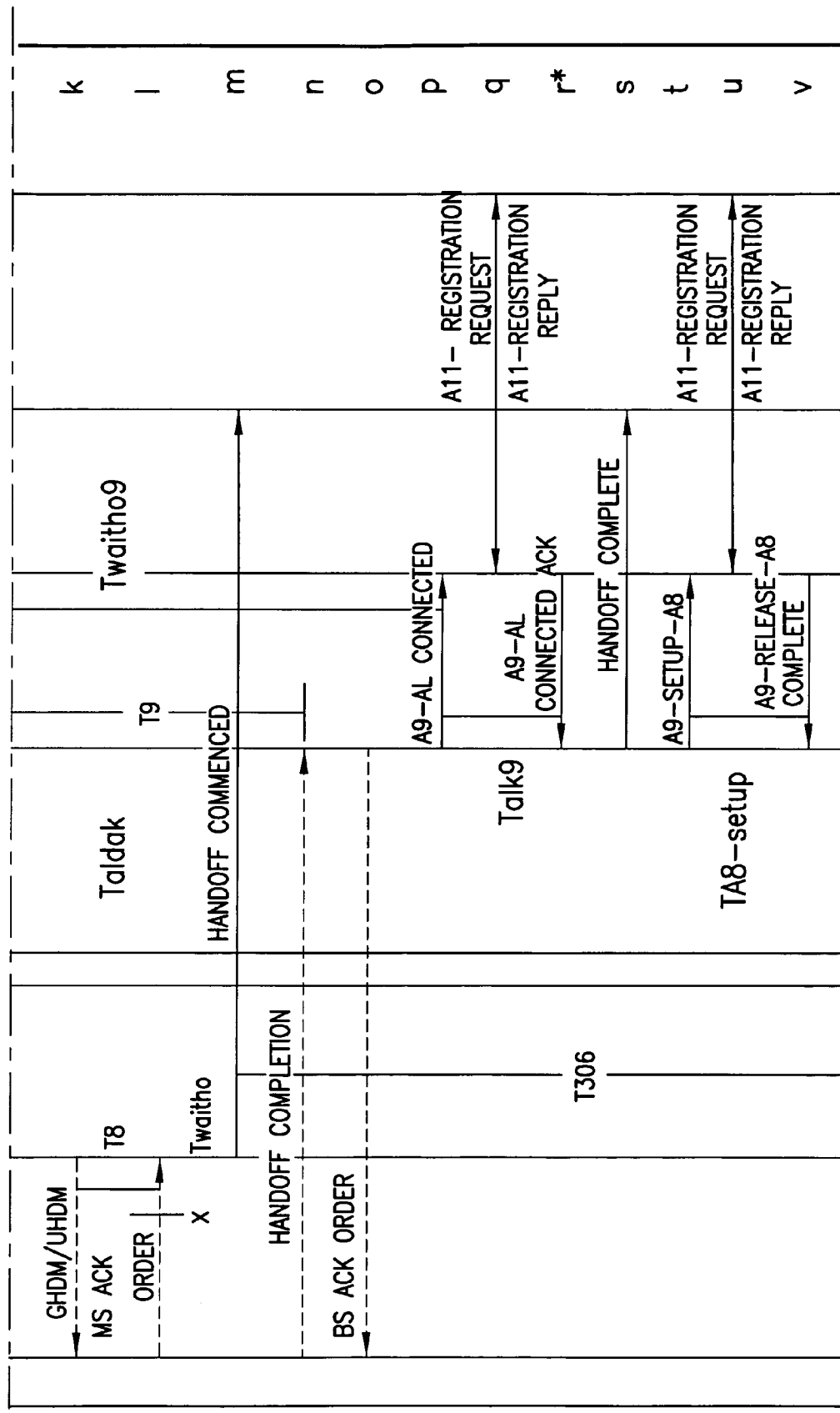
Figures 3, 3C:
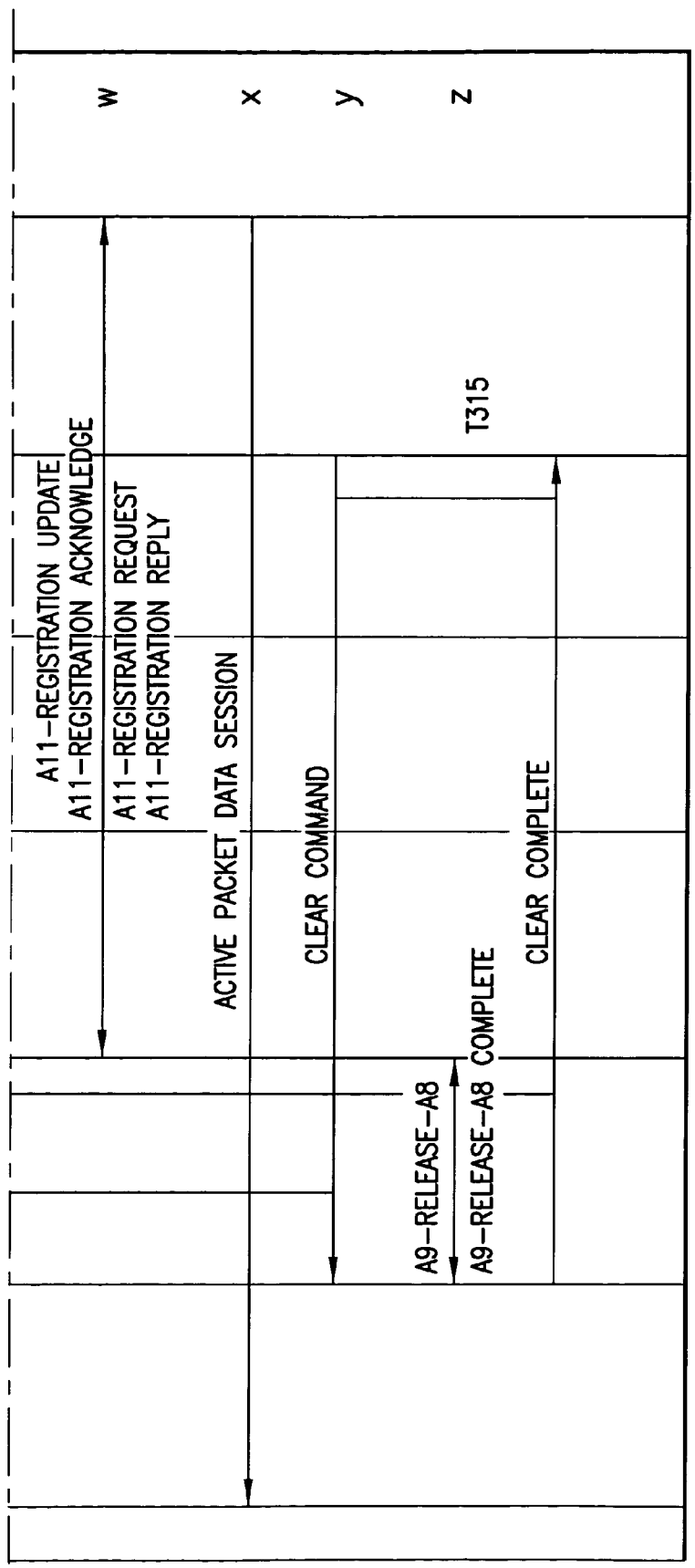

Reference is now made to the call or message flow diagram of FIG. 3. FIG. 3 illustrates the messages that pass between various ones of the network nodes and elements of FIG. 1, in accordance with an inter-PCF hard handoff procedure (in this case two PCFs 26 connected with the same PDSN, referred to as the anchor PDSN 28A in FIG. 3). FIG. 3 may also be viewed as a logic flow diagram that is illustrative of methods in accordance with exemplary embodiments of this invention. As in the case of FIG. 2, certain steps indicated with asterisks are modified in accordance with this embodiment of the invention, and only those steps that are changed in the call flow to implement this aspect of the invention are discussed. It is noted that since the source and target BSs are in the same RN 22, the source BS is referred to as BS 24, while the target BS is referred to as BS 24', and the source PCF is referred to as the PCF 26, and the target PCF is referred to as the PCF 26'.

Step b: As in the embodiment of FIG. 2, the HandoffRequired message from the source BS 24 to the MSC 14 carries information about the QoS state of each active and dormant service instance for the MS 10. This QoS state information may be considered to be the initial snapshot of the QoS state information.

Step c: The MSC 14 communicates this information to the target BS 24' in a HandoffRequest message.

As in the first embodiment discussed above, the existing Packet Session Parameters fields can be used for carrying the QoS information in both the HandoffRequired and the HandoffRequest messages.

Step d: When the target BS 24' sends the A9-Setup-A8 message to the target PCF 26' it indicates the SR_ID and the IMSI of the MS 10 in the message. The A9 Indicators message element in the message indicates to the target PCF 26' that this is for a handoff related call. The target PCF 26' then performs the A11 registration steps with the PDSN 28A as specified in the fast handoff scenario.

Step h: The PDSN 28A begins bi-casting the data to both the source PCF 26 and the target PCF 26'. The target PCF 26' forwards this data to the target BS 24'. This is done to ensure that whatever QoS state changes occur on the source BS 24 due to additional packets being sent in the forward direction are also reflected in the target BS 24'. The target BS 24' need not do anything with these packets, except to apply the same state change logic that is being applied by the source BS 24. In this manner the BS state is maintained up-to-date at the target BS 24' until the actual hard handover occurs.

Step j: As in the first embodiment, the state changes on the source BS 24 that are occurring due to the packets being received in the reverse direction from the MS 10 also need to be indicated to the target BS 24' to ensure that the BS state is completely synchronized after the handoff. The first state update information (initial state snapshot) that is sent to the target BS 24' in the HandoffRequired=>HandoffRequest message (Step b) may be changing because of the packets being received in the reverse direction between the time that the HandoffRequired message was sent and the UHDM/GHDM message sent by the source BS 24. To implement this function, the invention adds the updated state information to the A9-AL Disconnected message sent from the source BS 24 to the PCF 26. Upon receiving the A9-AL Disconnected message the source PCF 26 also sends to the PDSN 28A an A11 Registration Request with Active Airlink Stop record, and the updated state information carried in the A9-AL Disconnected message that was received from the source BS 24. The PDSN 28A sends an A11-Session Update message to the target PCF 26'. The PDSN 28A terminates bi-casting of the forward data to the source and target PCFs 26 and 26' in response to receiving the Active Airlink Stop record from the source PCF 26.

Step r: The target PCF 26' sends the A9-AL Connected Ack to the target BS 24' and includes the updated MS QoS state information that was received in Step j from the PDSN 28A.

If the anchor PDSN 28A is unreachable from the target PCF 26', then the P-P interface 29 can be used such that the messages that are sent to the target PCF 26' are sent over the P-P interface to the target PDSN 28B from the anchor PDSN 28A.

As in the first embodiment, it is preferred that in order to avoid any loss of data in the reverse direction, and any loss of state because of this possible loss of data, the MS 10 begins buffering the data that it would have sent in the reverse direction once it receives the GHDM/UHDM message (see Step k). The MS 10 resumes sending the data in the reverse direction once it receives the BS Ack Order message from the target BS 24' (Step o) in response to the Handoff Completion message (Step n). This ensures maintenance in the order of delivery of data for any protocols that require ordered delivery of data to maintain their state.

The foregoing procedure, since it also re-uses much of the existing standard, also has a minimal impact on the existing standard.

In a further aspect of this invention there is provided an improved technique for performing the inter-BS soft handoff.

Figure 4:
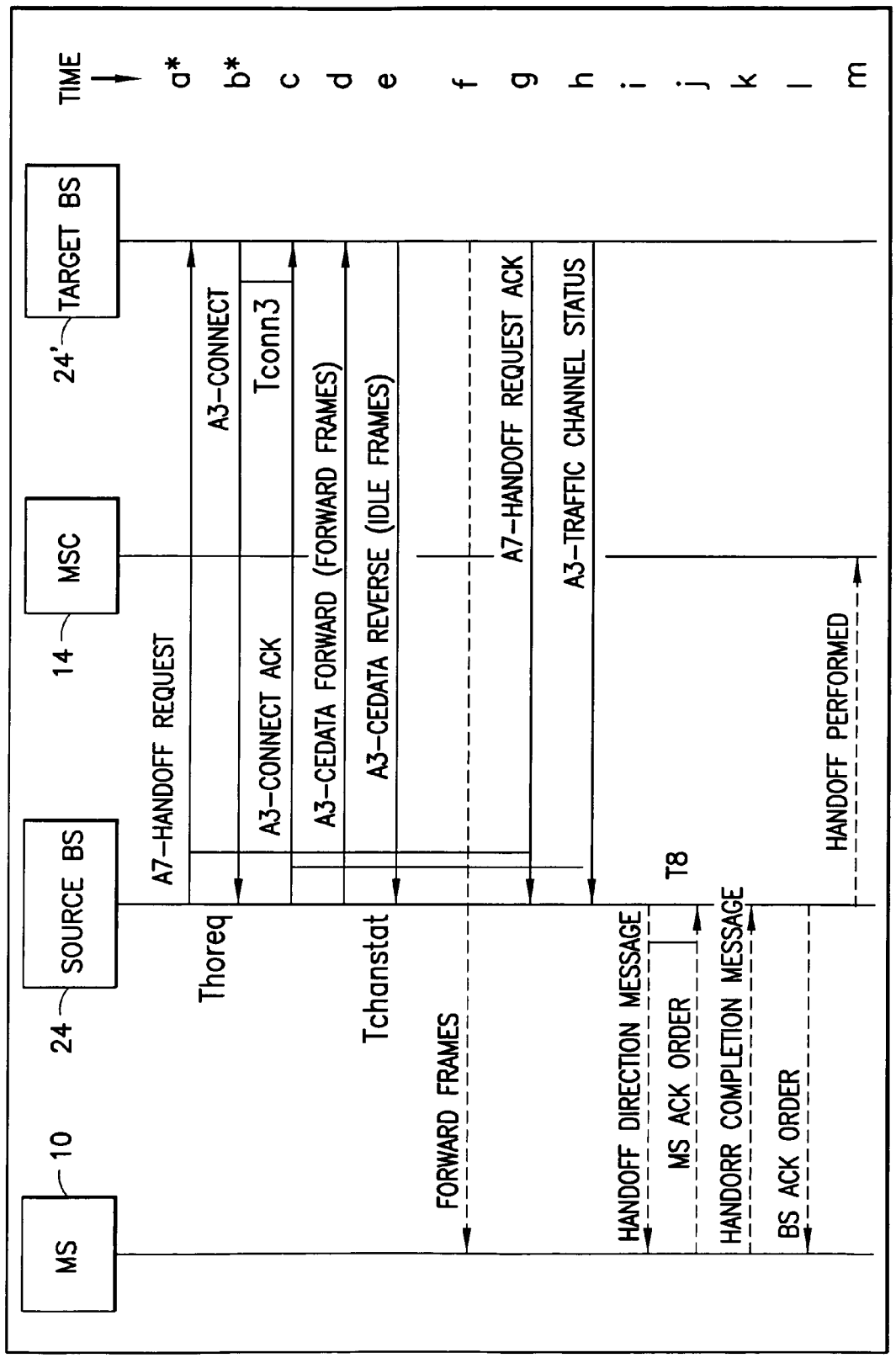
FIG. 4 is diagram that illustrates the messages that pass between various ones of the network nodes and elements of FIG. 1, and reproduces FIG. 3.19.3.2.1-1 of 3GPP2 A.S0013-A v2.0.1, entitled Soft/Softer Handoff Addition, wherein steps indicated with an asterisk are modified in accordance with an exemplary embodiment of this invention as described below.
Figure 5:
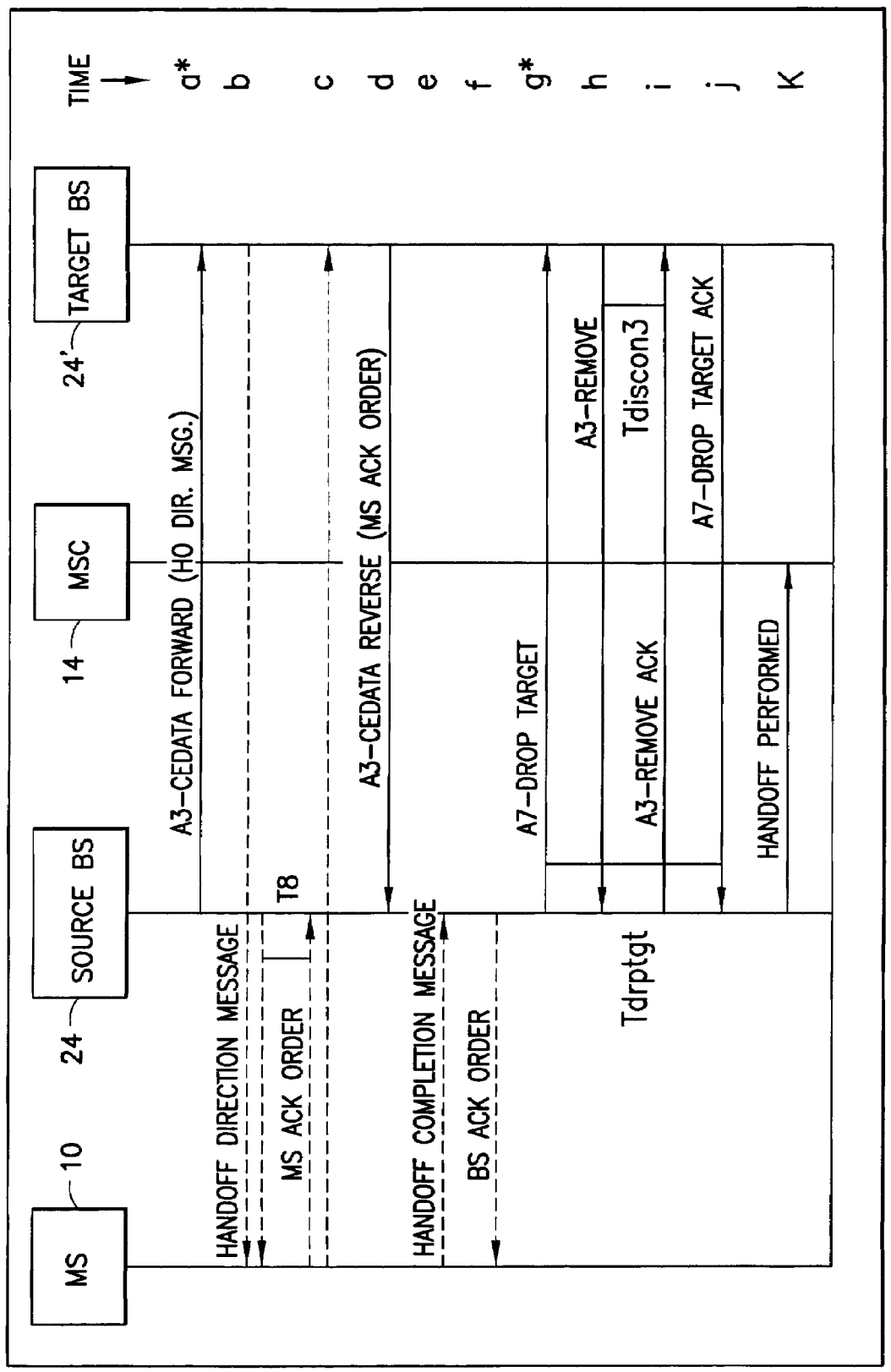
FIG. 5 is diagram that illustrates the messages that pass between various ones of the network nodes and elements of FIG. 1, and reproduces FIG. 3.19.3.2.2-1 of 3GPP2 A.S0013-A v2.0.1, entitled Soft/Softer Handoff Removal, wherein steps indicated with an asterisk are modified in accordance with an exemplary embodiment of this invention as described below.

When the MS 10 encounters a soft handoff, the MS 10 follows the soft handoff procedure defined in 3GPP2, as modified as discussed below. Reference can be made to FIG. 3.19.3.2.1-1 of 3GPP2 A.S0013-A v2.0.1, reproduced herein as FIG. 4, and to FIG. 3.19.3.2.2-1 of 3GPP2 A.S0013-A v2.0.1, reproduced herein as FIG. 5. FIGS. 4 and 5 may also each be viewed as a logic flow diagram that is illustrative of methods in accordance with exemplary embodiments of this invention.

Referring to FIG. 4 and at Step a, when the source BS 24 sends the A7 Handoff Request to the target BS 24', the source BS 24 provides the static contexts and QoS information for each active MS 10 service instance. These static contexts include SR_ID and corresponding QoS (both requested and granted QoS). However, the dynamic contexts, such as header compression parameters, are not transferred at this time.

Step b. The target BS 24' informs the source BS 24 of the resulting service instances that are supported at the target BS 24', including the granted QoS. The source BS 24 passes this information to the MS 10.

Steps c–m. The source BS 24, target BS 24' and the MS 10 complete the Handoff Addition procedure as specified in FIG. 3.19.3.2.1-1 of 3GPP2 A.S0013-A v2.0.1.

At this point there are three possibilities. A) The MS 10 roams back to the source BS 24 and the target BS 24' rejoins the inactive set. B) The MS 10 roams to another BS before the current target BS 24' becomes the only serving BS. C) The MS 10 roams closer to the current target BS 24' such that the source BS 24 should be removed from the active set. For case A, there is no need for further context transfer, as the current target BS 24' is removed from the active set, and the A3/A7 interface (see FIG. 1) is torn down. For case B also there is no need for further context transfer, as the current target BS 24' is removed from the active set, A3/A7 is torn down, and the procedure will repeats Step a above. When case C occurs, however, further context transfer is necessary. The following steps apply only to case C.

When the source BS 24 is to be dropped from the active set, the handoff procedure follows FIG. 3.19.3.2.2-1 of 3GPP2 A.S0013-A v2.0.1 (FIG. 5 herein) with the changes described below.

Step a. When the target BS 24' receives the A3-CEData Forward message from source BS 24, it sends a handoff direction message to the MS 10, as currently specified, but also begins the A8/A9 connection with the PCF 26 and the A10/A11 connection with PDSN 28, since only at this point is it certain that these interfaces are going to be required.

Step g. When the source BS 24 sends the A7-Drop Target message to the target BS 24', it includes all of the dynamic context information regarding the MS 10, such as the HRL parameters for S060/61. For the purposes of this invention the sending of the A7-Drop Target message maybe considered to indicate the beginning of the termination of the soft handover procedure. It is presently preferred to transfer the dynamic contexts at this time, as it is clear that the dynamic contexts are up-to-date, and the source BS 24 will no longer receive any further MS 10 data frames that could render the context information out-of-date. Thus, when the target BS 24' receives a further data frame, the contexts that is has received from the source BS 24 are known to be up to date. This prevents the possibility of an out of synchronization condition existing between a received data frame and the MS 10 context.

Steps h–k are then executed in a conventional fashion in order to complete the handoff procedure so that the target BS 24' removes the internal resource for the specified cell.

Advantages that are gained from the use of this aspect of the invention are several. For example, there is no lost context information during handoff, thereby ensuring that the state information is up-to-date, accurate, and synchronized during the soft handoff. In addition, this aspect of the invention distinguishes static from dynamic contexts and transfer them appropriately.

Based on the foregoing description it can be appreciated that an aspect of this invention is related to performing context transfers to maintain the same quality of service (QoS) for the MS 10 during a CDMA inter-BS hard handoff.

Based on the foregoing description it can be appreciated that another aspect of this invention is related to performing context transfers to maintain the same QoS for the MS 10 during a CDMA inter-BS soft handoff.

Based on the foregoing description it can be further appreciated that a further aspect of this invention is related to performing context transfers to maintain the same QoS for the MS 10 during a CDMA inter-PCF hard handoff.

Figure 6:
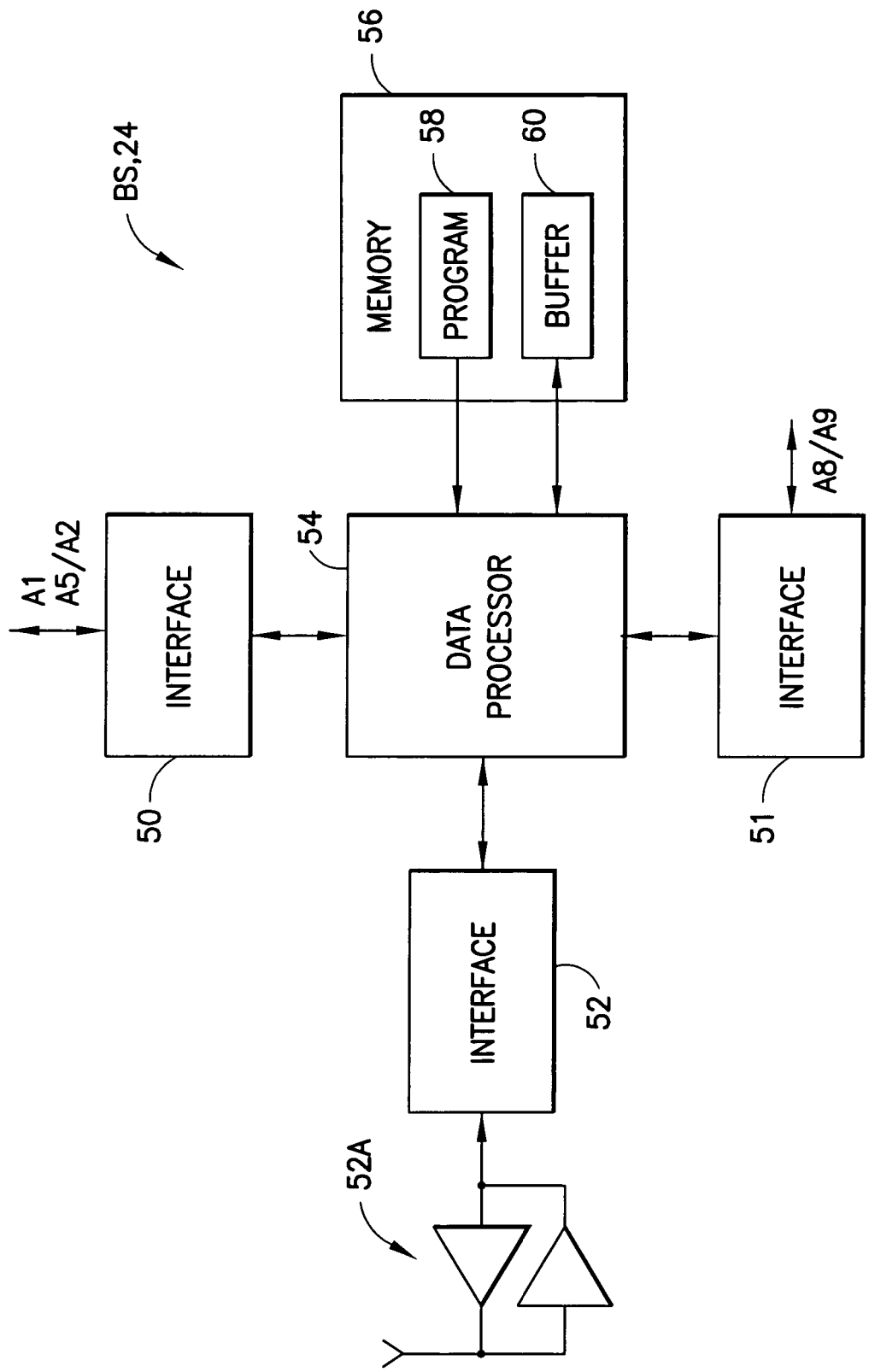
FIG. 6 is a simplified block diagram of a BS in accordance with an exemplary embodiment of this invention.

In accordance with the foregoing description, and referring to FIG. 6, it can be appreciated that an aspect of this invention is a BS 24 that is operable with the MS 10 during a hard or a soft handoff procedure, and functions during the handoff procedure as either the source BS 24 or the target BS 24'. As is shown in FIG. 6, the BS 24, 24' includes a first interface 50 for use in establishing the A1, A5/A2 interface with the MSC 14; a second interface 52 that comprises a wireless transceiver 52A for use in establishing the wireless link with the MS 10 (preferably but not necessarily a CDMA wireless link), and a third interface 51 for establishing the A8/A9 link with an associated PCF 26. The BS 24, 24' also includes at least one data processor 54 coupled to a memory 56 wherein there are stored computer program instructions 58 that are executable by the at least one data processor 54 to cause the at least one data processor 54 to function in accordance with and to execute the various methods disclosed herein and shown in FIGS. 2, 3, 4 and 5. The memory 56 may also include a data buffer 60 for buffering at least MS 10 packet data as well as static and dynamic QoS context information, as described above.

Figure 7:
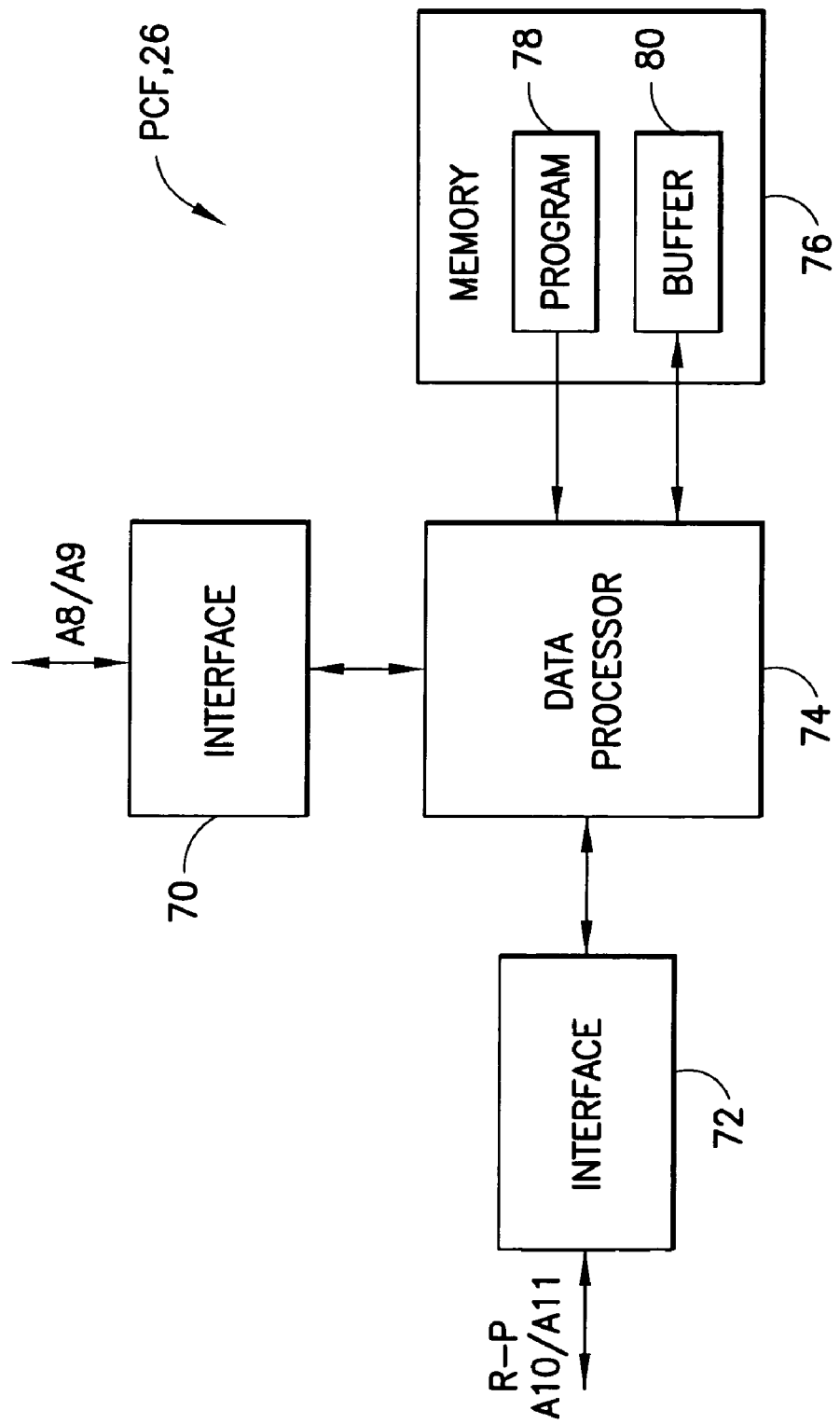
FIG. 7 is a simplified block diagram of a PCF in accordance with an exemplary embodiment of this invention.

Further in accordance with the foregoing description, and referring to FIG. 7, it can be appreciated that an aspect of this invention is a PCF 26 that is operable with the BS 24 and the PDSN 28 during hard or soft handoff procedures, and that may function during the handoff procedure as either the source PCF 26 or the target PCF 26'. As is shown in FIG. 7, the PCF 26, 26' includes a first interface 70 for use in establishing the A8/A9 interface with the BS 24; and a second interface 72 for establishing the R-P, A10/A11 interface with the associated PDSN 28. The PCF 26, 26' also includes at least one data processor 74 coupled to a memory 76 wherein there are stored computer program instructions 78 that are executable by the at least one data processor 74 to cause the at least one data processor 74 to function in accordance with and to execute the various methods disclosed herein and shown in FIGS. 2, 3, 4 and 5. The memory 76 may also include a data buffer 80.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent message names, message formats, types of static and dynamic contexts, and network 12 elements and functions may be attempted by those skilled in the art. However, all such and similar modifications of the teachings of this invention will still fall within the scope of this invention.

Furthermore, some of the features of the present invention could be used to advantage without the corresponding use of other features. For example, a particular implementation may employ only the improved context transfer mechanism for inter-BS hard and/or soft handoffs, and not the improved context transfer mechanism for inter-PCF hard handoffs, or vice versa. As such, the foregoing description should be considered as merely illustrative of the principles of the present invention, and not in limitation thereof.

What is claimed is:

1. A method to perform an inter-Base Station (BS) hard handoff for a Mobile Station (MS) from a source BS to a target BS, comprising:

at the start of the handoff procedure, sending a message from the source BS that comprises current QoS state information of each active and dormant service instance for the MS, and communicating the current QoS state information to the target BS;

beginning the bi-casting of forward data for the MS from a Packet Control Function (PCF) to both the source BS and to the target BS, and updating the communicated current QoS state information in the target BS based on received bi-cast data;

continuing the updating of the QoS state information in the source BS based on data received from the MS, and communicating the updated QoS state information to the PCF with a source BS Disconnected message;

in response to receiving the source BS Disconnected message, terminating the bi-casting of data with the PCF; and when sending a Connected message to the target BS, also sending the updated QoS state information that was previously communicated from the source BS, thereby updating the target BS for a change in QoS state information that may have occurred at the source BS due to arrival of data from the MS prior to the source BS sending the Disconnected message.

2. A method as in claim 1, further comprising beginning the buffering of data in the MS that would have been sent in the reverse direction in response to receiving a message initiated by the source BS sending the Disconnect message, and resuming the sending of data in the reverse direction in response to receiving a message from the target BS indicating that the handoff procedure is completed.

3. A method to perform an inter-Packet Control Function (PCF) hard handoff for a Mobile Station (MS) from a source PCF associated with a source Base Station (BS) to a target PCF associated with a target BS, comprising:

at the start of the handoff procedure, sending a message from the source BS that comprises current QoS state information of each active and dormant service instance for the MS, and communicating the current QoS state information to the target BS;

beginning the bi-casting of forward data for the MS from a Packet Data Support Node (PDSN) to both the source PCF and to the target PCF;

forwarding the bi-cast data from the source PCF to the source BS and from the target PCF to the target BS for updating the communicated current QoS state information in the target BS based on the received bi-cast data forwarded from the target PCF;

continuing the updating of the QoS state information in the source BS based on data received from the MS, and communicating the updated QoS state information to the source PCF with a source BS Disconnected message;

in response to receiving the source BS Disconnected message, forwarding the updated QoS state information from the source PCF to the PDSN;

forwarding the updated QoS state information from the PDSN to the target PCF; and when sending a Connected message to the target BS from the target PCF, also sending the updated QoS state information that was previously communicated to the target PCF from the source BS via the source PCF and the PDSN, thereby updating the target BS for a change in QoS state information that may have occurred at the source BS due to arrival of data from the MS prior to the source BS sending the Disconnected message.

4. A method as in claim 3, further comprising beginning the buffering of data in the MS that would have been sent in the reverse direction in response to receiving a message initiated by the source BS sending the Disconnect message, and resuming the sending of data in the reverse direction in response to receiving a message from the target BS indicating that the handoff procedure is completed.

5. A method to perform an inter-Base Station (BS) soft handoff for a Mobile Station (MS) from a source BS to a target BS, comprising:

when making an initial soft handoff request, transferring only static QoS context state information from the source BS to the target BS, and informing the source BS of what context state information is supported by the target BS; and only for a case where the source BS is to be dropped from an active set of BSs in favor of the target BS, when sending a handoff direction message to the MS from the target BS also initiating an interface setup procedure with an associated Packet Control Function (PCF) and an associated Packet Data Support Node (PDSN); and when sending a message from the source BS to the target BS to indicate the beginning of the termination of the soft handover procedure, transferring dynamic QoS context state information from the source BS to the target BS.

6. A method as in claim 5, where transferring only static QoS context state information transfers both QoS requested and granted context state information.

7. A method as in claim 5, where the message sent from the source BS to the target BS to indicate the beginning of the termination of the soft handover procedure comprises a A7-Drop Target message and triggers the source BS to transfer dynamic context to the target BS.

8. A Base Station (BS) operable with a Mobile Station (MS) during an inter-BS hard handoff procedure, said BS comprising a wireless transceiver operable for communicating with the MS; an interface operable for communication with a Packet Control Function (PCF); at least one data processor bidirectionally coupled to the wireless transceiver and to the interface; and a memory wherein is stored computer program instructions that are executable by the at least one data processor to cause the at least one data processor to function during the handoff procedure as either a source BS or a target BS, and when operating as a source BS to send at the start of a handoff procedure a message that comprises current QoS state information of each active and dormant service instance for the MS, and to receive the current QoS state information when functioning as the target BS; to receive bi-cast forward data for the MS from the PCF, and to update the current QoS state information based on received bi-cast data; when functioning as the source BS, to continue updating of the QoS state information based on data received from the MS, and to communicate the updated QoS state information to the PCF with a source BS Disconnected message; and when functioning as the target BS and in response to receiving a Connected message, also receiving the updated QoS state information that was previously communicated from the source BS, thereby updating the target BS for a change in QoS state information that may have occurred at the source BS due to arrival of data from the MS prior to the source BS sending the Disconnected message.

9. A BS as in claim 8, where the BS is a component of a CDMA-based Mobile IP network.

10. A BS as in claim 8, where the MS comprises a cellular telephone.

11. A Packet Control Function (PCF) operable with a Base Station (BS) and a Packet Data Support Node (PDSN) during an inter-PCF hard handoff procedure, said PCF comprising a first interface operable for communication with the BS; a second interface operable for communication with the PDSN; at least one data processor bidirectionally coupled to the first interface and to the second interface; and a memory wherein is stored computer program instructions that are executable by the at least one data processor to cause the at least one data processor to function during the handoff procedure as either a source PCF or a target PCF, where in response to a source BS sending at the start of a handoff procedure a message that comprises current QoS context state information of each active and dormant service instance for the MS, and further in response to a target BS receiving the current QoS state information; to contact the PDSN and in response to receive bi-cast forward data for the MS from the PDSN, and to forward the received bi-cast data through the first interface to the associated BS whereby, if the target PCF, the associated target BS is enabled to update the current QoS state information based on received bi-cast data forwarded by the PCF; forwarding the bi-cast data from the source PCF to the source BS and from the target PCF to the target BS for updating the communicated current QoS state information in the target BS based on the received bi-cast data forwarded from the target PCF; to receive updated QoS state information from the source BS when functioning as the source PCF with a source BS Disconnected message and, in response to receiving the source BS Disconnected message, to forward the updated QoS state information to the PDSN; when functioning as the target PCF to receive the updated QoS state information that is forwarded from the PDSN; and when sending a Connected message to the target BS when functioning as the target PCF, to include the updated QoS state information that was previously forwarded to the target PCF from the PDSN, thereby updating the target BS for a change in QoS state information that may have occurred at the source BS due to arrival of data from the MS prior to the source BS sending the Disconnected message.

12. A PCF as in claim 11, where the PCF is a component of a CDMA-based Mobile IP network.

13. A PCF as in claim 11, where the MS comprises a cellular telephone.

14. A Base Station (BS) operable with a Mobile Station (MS) during an inter-BS soft handoff procedure, said BS comprising a wireless transceiver operable for communicating with the MS; an interface operable for communication with a Packet Control Function (PCF); at least one data processor bidirectionally coupled to the wireless transceiver and to the interface; and a memory wherein is stored computer program instructions that are executable by the at least one data processor to cause the at least one data processor to function during the soft handoff procedure as either a source BS or a target BS, and when operating as a source BS to send at the start of a soft handoff procedure a message to the target BS that comprises static QoS content state information for the MS, and to receive the static QoS context state information when functioning as the target BS and to inform the source BS of what context state information is supported by the target BS and, only for a case where the source BS is to be dropped from an active set of BSs in favor of the target BS, when functioning as the target BS when sending a handoff direction message to the MS from the target BS also initiating an interface setup procedure with an associated Packet Control Function (PCF) and an associated Packet Data Support Node (PDSN); and when functioning as the source BS when sending a message from the source BS to the target BS to indicate the beginning of the termination of the soft handover procedure, to transfer dynamic QoS context state information to the target BS.

15. A BS as in claim 14, where transferring only static QoS context state information transfers both QoS requested and granted context state information.

16. A BS as in claim 14, where the message sent from the source BS to the target BS to indicate the beginning of the termination of the soft handover procedure comprises a A7-Drop Target message and triggers the source BS to transfer dynamic context to the target BS.

17. A BS as in claim 16, where the BS is a component of a CDMA-based Mobile IP network.

18. A BS as in claim 16, where the MS comprises a cellular telephone.

* * * * *